Figure 5:
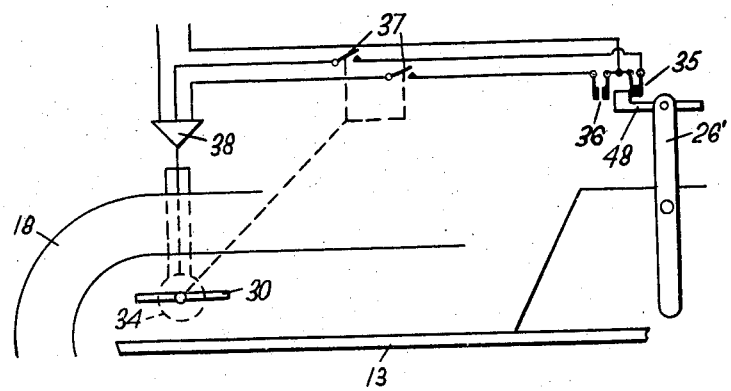

Oct. 13, 1964    M. N. COLLIS    3,152,656
GASEOUS CUSHION-SUPPORTED VEHICLES
Filed Aug. 3, 1961    3 Sheets-Sheet 1
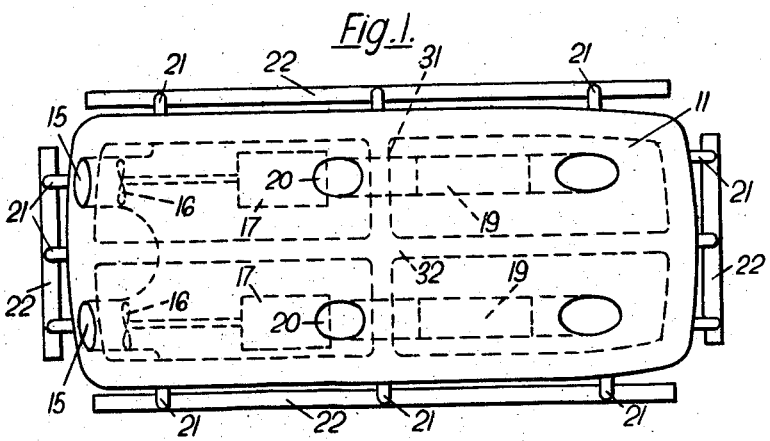
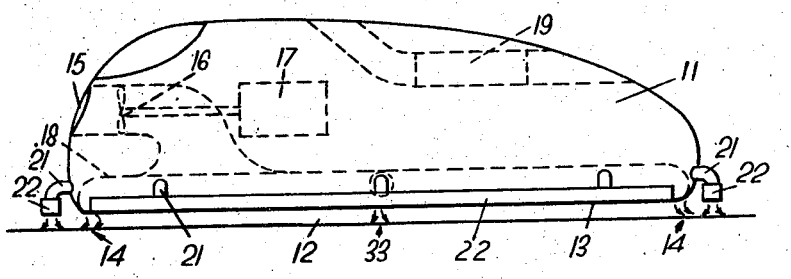
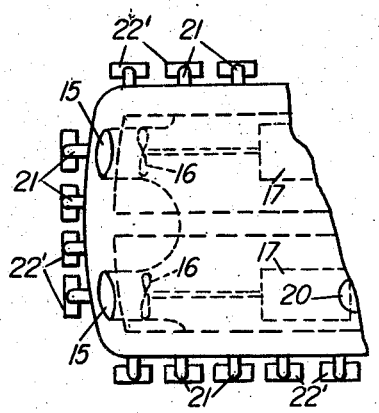
Inventor
MICHAEL N. COLLIS
By
Cameron, Kerkam 7 Sutton
Attorneys

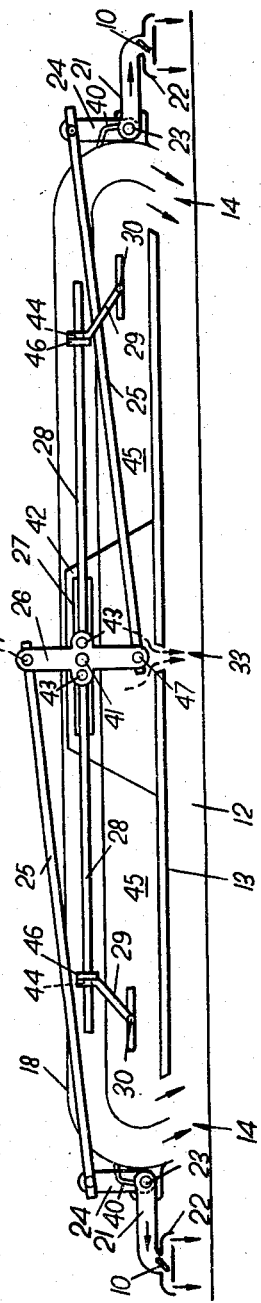
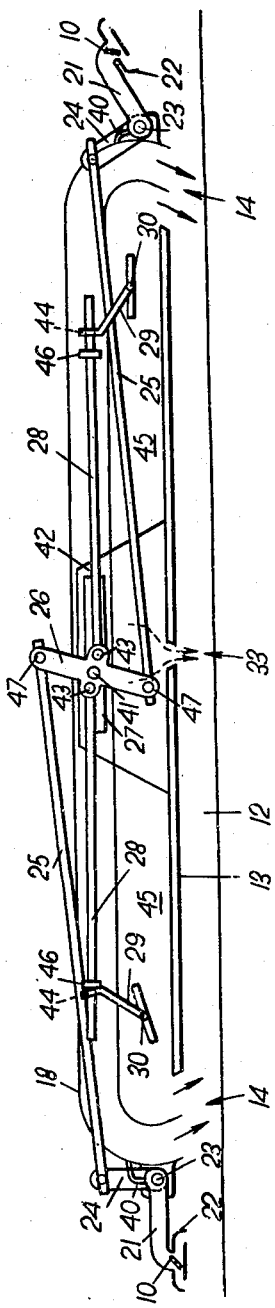

Oct. 13, 1964   M. N. COLLIS   3,152,656
GASEOUS CUSHION-SUPPORTED VEHICLES
Filed Aug. 3, 1961   3 Sheets-Sheet 3

Inventor
MICHAEL N. COLLIS
By
Cameron, Kerkam & Sutton
Attorneys

United States Patent Office 3,152,656
Patented Oct. 13, 1964

3,152,656
GASEOUS CUSHION-SUPPORTED VEHICLES
Michael Neild Collis, Nova Scotia, Canada, assignor to National Research Development Corporation, London, England, a British corporation
Filed Aug. 3, 1961, Ser. No. 129,173
Claims priority, application Great Britain, Aug. 5, 1960, 27,326/60
11 Claims. (Cl. 180—7)

This invention relates to vehicles of the ground effect type which travel supported on a gaseous cushion. In one type of such craft, for instance, the cushion is of air and is maintained under a basal area of the vehicle by a fluid wall or curtain surrounding the cushion periphery and extending across the gap between the vehicle base and the ground or water surface over which the vehicle is travelling. The fluid curtain may be an air curtain created below the vehicle by a continuous discharge of air in a downward and inward direction all around the periphery of the basal area under which the cushion is to be maintained.

To operate in a stable and controllable manner, such an air cushion vehicle needs to maintain a substantially constant angle between its underside and the mean level of the surface underneath it. Normally this angle will be 0 degrees. There are a number of factors that can, if unchecked, cause the angle to vary appreciably in an unwanted manner. These include instability of the hover system, alteration of the centre of gravity of the vehicle due to the loading or unloading of freight, consuming of fuel, passenger movement and so forth, and the application of forces such as aerodynamic lift and propulsive thrust. When the angle changes the ground clearance will be reduced on one side and the whole vehicle will tend to move in that direction. Both these effects are undesirable and may be dangerous, particularly at high speeds.

To alleviate this problem there have been fitted auxiliary air curtain jets to create a second air curtain spaced from the first, with valves or spoilers for varying the air to the jets of one curtain, these spoilers being manually controlled by the vehicle operator. However, since the vehicle operator depends on vision for estimating the attitude of the vehicle this system is clearly unsatisfactory for use at night, in poor visibility, or in large vehicles where it will be difficult for the operator to see the edges of the craft and hence to judge his attitude.

According to the present invention there is provided a vehicle of the kind that can hover and travel on a gaseous cushion maintained under its base, with fluid-operated height sensors mounted around the vehicle so as to be able to rise and fall relatively thereto and arranged to signal, according to their relative positions, inclination of the vehicle with respect to the ground or other surface beneath, and means responsive to the height-sensor signals for correcting departure of the vehicle from a level or other desired attitude in pitch and/or roll.

Each height sensor may comprise a pad or plate disposed out clear of the vehicle boundary and provided around its own boundary with downwardly-directed fluid jets, to form a fluid curtain maintaining under the pad a gaseous cushion on which it rides over the ground or other surface beneath.

Figure 6:
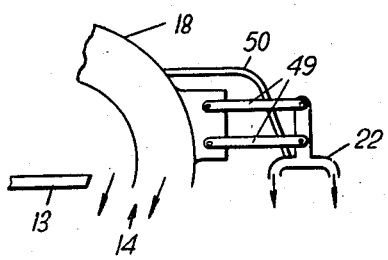

These and other features of the invention will be apparent in the following description, given by way of example, of ways of carrying the invention into practice, reference being had to the accompanying drawings in which:

FIGURE 1 is a diagrammatic plan of a ground effect vehicle of the air curtain type;
FIGURE 2 shows the vehicle in side elevation;
FIGURES 3 and 4 illustrate diagrammatically in cross-section the arrangement and operation of a vehicle levelling system according to the invention;
FIGURE 5 shows a modification of the system of FIGURE 4;
FIGURE 6 illustrates an alternative way of mounting a sensor on the vehicle; and
FIGURE 7 is a fragmentary diagrammatic plan view similar to FIGURE 1 illustrating an alternative sensor pad arrangement.

The vehicle 11 shown in FIGURES 1 and 2 is capable of both hovering stationary and travelling while supported on a cushion of air that can be maintained in the region 12 under a flat basal area 13 of the vehicle. The air cushion is generated by curtain air jets at 14 all around the periphery of the basal area 13 which direct air downwardly and inwardly under the vehicle. The air for the curtain jets is drawn through forward-facing intakes 15 by a pair of ducted propellors or fans 16 driven by engines 17, and is delivered to an air passage 18 that extends all round the base of the vehicle to supply the jets. The vehicle is propelled by a pair of jet-propulsion engines 19 having air intakes 20 and delivering rearwardly two substantially parallel jet streams spaced apart in the direction of width of the vehicle.

In order to sense the ground clearance a number of floating arms 21 project outwardly around the vehicle near its base. These arms are arranged at intervals at the front and rear of the vehicle and along both sides. The arms terminate in sensor pads 22 that are, in effect, miniature air cushion vehicles. That is to say each pad has downwardly-directed jets around its periphery, like the main vehicle, to create for itself a cushion of air on which it rides.

It is possible to have, along any one boundary of the vehicle, either one or more long pads 22 with a number of arms 21 carrying the one pad, as shown in FIGURE 1, or a series of indvidual comparatively short sensor pads 22' each on its own separate arm 21, as illustrated in FIGURE 7.

As seen in FIGURES 3 and 4, the arms 21, which are hollow, are attached to the main vehicle by pivotal connections 23, and air is supplied to the sensors 22 from the main vehicle fan discharge passage 18 through the hollow arms 21. The air may be delivered from passage 18 to the interiors of arms 21 in any suitable manner, as by making pivotal connections 23 in the form of hollow sleeves having peripheral ports communicating with the interiors of arms 21 and providing ducts for feeding air from passage 18 to said sleeves. The arms and sensor pads are so designed, as to size, weight and so forth, that the sensor pad can maintain a convenient height from the ground or other surface over which the vehicle hovers when in action. For a given configuration of sensor, the sensor hover height depends primarily on the effective area of the sensor pad, the pressure of the air delivered and the weight borne by the sensor; the height may therefore be varied by varying any one of these factors. In general, however, the sensor height will be substantially the hover height of the vehicle, bearing in mind that it will normally be necessary for the sensor pads to clear what the main vehicle is able to clear. It is not, however, essential that the pads all round should maintain the same height; the pads at the front of the vehicle might be set higher than the remainder for example.

While the sensor pads can, if desired, all be fed with air from one point in the main vehicle air supply it will usually be more convenient to take the air for each pad from a point adjacent to it on the peripheral air passage 18 for the curtain jets of the main vehicle. Any differences in pressure at the pads can be overcome by trimming each pad individually until it maintains the correct height. There can, for example, be a spoiler or flow regulating hinged butterfly type valve in each pad as indicated at 10 in FIGURES 3 and 4, which spoiler is angularly adjustable for trimming purposes and may be similar in construction and mode of operation to the curtain air valves or spoilers 30 hereinafter described. Since any such differences in pressure are inherent in the particular design of a vehicle and remain substantially constant the trimming may be a more or less permanent calibration carried out when the vehicle is built and tested.

Consider one pair of arms 21 as shown in FIGURES 3 and 4, and placed at say, the middle of the front and rear boundaries of the vehicle. Each sensor 22 maintains a substantially constant height above the ground or the like, so that if one end of the vehicle falls the arm at that end will rise relative to the vehicle. The difference between the positions of the two arms relative to the vehicle is arranged to result in the control of curtain air valves or spoilers 30 causing the "high" end of the vehicle to be lowered until the vehicle returns to a level attitude.

In order to show how this principle can be applied, an elementary control mechanism has been illustrated. Each arm 21 is part of a bell crank lever with a second upwardly-extending arm 24, and the arms 24 are linked to opposite ends of an upright floating control lever 26 by long links 25. A pivot pin 41 at the centre of the lever 26 slides in a horizontal slot 27 in a plate 42 which is attached to the vehicle structure. Rods 28 are pin-jointed at 43 to the lever 26 in the region of the pivot pin 41, and the outer ends of these rods slide through holes 44 in the upper ends of levers 29 which operate balance control flap valves or spoilers 30. The arrangement shown is that of a vehicle having a double air curtain, the air for the outer curtain being supplied through the passage 18 while that for the inner curtain is supplied through the space 45 between the basal area 13 of the vehicle and the passage 18. The valves 30 are located in the space 45 and operate to reduce the amount of air supplied to the inner curtain at one side or the other of the vehicle, thereby causing that side to fall relatively to the ground. Fixed collars 46 on the rods 28 ensure that each valve 30 tends to close when its associated rod is pushed outwards but stays open when the rod is pulled inwards.

Operation is as follows. On starting up the vehicle's engine, air is supplied to the floating arms which rise to their operating height. The lever 26 merely rotates about its central pin 41 and both control flap valves 30 remain open. When the vehicle rises and hovers, any difference in the ground clearance of the front and rear ends will result in a proportionate movement of the pin 41 in the slot 27. FIGURE 4 shows the position when the rear end has dropped. The lever 26 has turned about its upper pin joint 47 and its centre pin 41 has moved forward in the slot 27. The forward rod 28 has therefore pushed the forward control valve 30 towards the shut position, which will cause the forward end to be lowered due to the decreased flow of air to the forward portion of the inner curtain air jet 14.

A similar mechanism deals with the port and starboard sides of the vehicle.

However, while such an arrangement will deal with transient disturbances tending to tilt the vehicle, in the case of a long term tilting influence such as a shift of the position of the load on the vehicle the remedial measure described will tend to result in cross air-flow within the air cushion itself thus destroying the advantages gained. To curb this therefore, the vehicle is provided with central longitudinal and transverse air ducts 31, 32 (FIGURE 1) supplying additional air jets that maintain intersecting central stabilising curtains of air as indicated at 33. These central curtains have the effect of dividing off the air cushion space into four compartments, with cross air-flow in the cushion from one compartment to another substantially prevented.

The above type of mechanical control linkage will not keep the vehicle always absolutely parallel to the ground, but a simple power servo system can be fitted which will do this with negligible error. Each control flap valve 30 can, for instance, be operated as shown in FIGURE 5 by a reversible electric motor 34, control being effected by contacts 35, 36 closed by an arm 48 mounted on the lever 26', it being understood that the lever 26' is also connected to and operated by sensors in the manner indicated in FIGURES 3 and 4. The motor 34 can be fed through an amplifier 38. It can operate its own limit switches 37; or alternatively there may be a feedback potentiometer arrangement and the lever 26' may be arranged to operate the slider of an input signal potentiometer, instead of simple switches, to give a still more sensitive control.

The attachment of the sensor pads 22 is not restricted to the type of hinged arm shown in FIGURES 1 to 5. A parallelogram linkage arrangement 49 can with advantage be employed, as in FIGURE 6, in order to maintain parallelism of the pad 22 with the ground; or it may be found more convenient to fit a telescopic arrangement. In this embodiment, air is supplied to each pad 22 from passage 18 through a duct 50.

It will ordinarily be necessary to have a sensor pad or set of sensor pads along the full length of each boundary of the vehicle and thus measure the average height above the surface beneath. In some cases, such as when a large vehicle is employed with a considerable hover height, sets of small sensor pads along each boundary may be more practicable, and the individual sensors in each set can be coupled together to give the mean height along the whole boundary.

With a reasonably constant air supply pressure to the floating arms and a consequent constant hover height of the sensor pads, the angular position of the arms relative to the main vehicle structure is a function of the ground clearance of the appropriate side or boundary and can be used to provide ground clearance instrumentation. Furthermore, if the heights of all the boundaries are averaged by mechanical or other means the result will be the mean ground clearance or hover height.

A further aspect of the arrangement is that if provision is made for a controlled alteration of the relative position of one of each opposed pair of floating arms and its respective lever 26, for example by varying the length of its connecting link 25, then the attitude of the vehicle can be varied at will, and a horizontal component of the air curtain's thrust will be obtained that may be useful to propel the vehicle.

It will be appreciated that many further modifications of the arrangements illustrated are possible without departing from the scope of the invention. In particular, the vehicle shown in FIGURES 1 and 2 is merely one possible design of ground effect vehicle that can embody the invention.

Although in the system described the air flap valves 30 are normally fully open, they can be arranged so as to be ordinarily both partially open to an equal extent and for one to be moved in the closing direction while the other opens to a greater extent when a leveling effect is required.

The vehicle can be controlled in yaw by placing tiltable vanes in the jet curtain. These vanes can be fitted in pairs on opposite sides of the craft, and can be so coupled that they tilt simultaneously so that respective portions of the jet curtain are deflected from the vertical and produce a rotational moment in the required direction.

A further control arrangement is also possible whereby the pairs of vanes are caused to be tilted so as to produce jet curtain deflections which cancel out as far as yaw is concerned, but which result in some propulsive thrust. Thus a single pair of vanes fitted in the port and starboard air curtains could provide yaw control with the craft stationary, or a propulsion effect ahead or astern, or a combination of the two. Vane control arrangements of this type are shown in French Patent No. 1,358,780.

I claim:

1. A vehicle of the kind that can hover and travel on a gaseous cushion, comprising, in combination, a vehicle body having a base, means carried by said body for maintaining a gaseous cushion under said base to support said body above the ground or other surface beneath it, a plurality of height sensors disposed around the boundary of said body, mounting means connecting each of said sensors to said body for rising and falling movement relatively thereto, each sensor having discharge means for directing fluid therefrom out below the sensor to support the sensor above said ground or other surface, means on said body for delivering fluid to each sensor to supply said discharge means, means for sensing the position of each sensor relative to said vehicle body and producing control signals indicative of any inclination of said body with respect to said ground or other surface, and control means responsive to said control signals for correcting departure of said body from a level or other desired attitude in pitch and/or roll.

2. A vehicle as claimed in claim 1, wherein each height sensor comprises a pad disposed out clear of the vehicle body boundary and provided around its own boundary with downwardly-directed fluid jets to form a fluid curtain maintaining under the pad a gaseous cushion on which it rides over the ground or other surface beneath.

3. A vehicle as claimed in claim 2, wherein said body has a substantially flat basal area with main fluid jets all around the periphery of that area which are directed downwardly and inwardly for creating the gaseous cushion on which the vehicle hovers, and wherein the fluid supply for the height sensors is taken from a duct supplying these main fluid jets.

4. A vehicle as claimed in claim 3, wherein each height sensor at one boundary of the vehicle body is paired with another sensor located at the opposite boundary, and said control means comprising fluid-regulating means for regulating the relative fluid supplies to the main fluid jets of the vehicle at those boundaries in accordance with the heights relative to said body of the two sensors of said pair.

5. A vehicle as claimed in claim 4, wherein the fluid regulating means comprises valves mechanically coupled to laterally-projecting arms that are pivotally mounted on the vehicle and carry the sensor pads.

6. A vehicle as claimed in claim 4, wherein the fluid regulating means comprise valves that are controlled by the sensors through power-servo arrangements.

7. A vehicle as claimed in claim 5, wherein the gaseous cushion below the flat basal area of the vehicle body is effectively divided by downwardly-directed fluid jets that create additional fluid curtains at one or more intermediate positions across and/or along that area.

8. A vehicle as claimed in claim 1 wherein the fluid and the cushion gas are both air.

9. A vehicle as claimed in claim 1, wherein a boundary of the vehicle body is provided with one elongated height sensor extending parallel to it for at least the major part of the boundary length so as to sense the mean height of the boundary.

10. A vehicle as claimed in claim 1, wherein a boundary of the vehicle body is provided with a series of height sensors along its length so associated as to provide an indication of the mean height of that boundary.

11. A vehicle as claimed in claim 1, wherein the mounting means for each height sensor allows the sensor to rise and fall relatively to the vehicle body while keeping substantially parallel to the ground or other surface underneath.

References Cited in the file of this patent
FOREIGN PATENTS 1,238,499   France _____ July 4, 1960